(12) United States Patent
Swedlund et al.

(10) Patent No.: US 11,568,054 B2
(45) Date of Patent: Jan. 31, 2023

(54) WEB APPLICATION LOGIN MACRO GENERATION AND VERIFICATION

(71) Applicant: MICRO FOCUS LLC, Santa Clara, CA (US)

(72) Inventors: Thomas Christopher Swedlund, Alpharetta, GA (US); Constantine Adarchenko, Alpharetta, GA (US)

(73) Assignee: MICRO FOCUS LLC, Santa Clara, CA (US)

( * ) Notice: Subject to any disclaimer, the term of this patent is extended or adjusted under 35 U.S.C. 154(b) by 734 days.

(21) Appl. No.: 16/437,962

(22) Filed: Jun. 11, 2019

(65) Prior Publication Data

US 2020/0394307 A1 Dec. 17, 2020

(51) Int. Cl.
*G06F 21/57* (2013.01)
*G06F 16/958* (2019.01)
*G06F 9/455* (2018.01)

(52) U.S. Cl.
CPC ........ *G06F 21/577* (2013.01); *G06F 9/45512* (2013.01); *G06F 16/958* (2019.01)

(58) Field of Classification Search
CPC ... G06F 21/577; G06F 16/958; G06F 9/45512
USPC .................................... 715/200, 234; 726/25
See application file for complete search history.

(56) References Cited

U.S. PATENT DOCUMENTS

| | | | |
|---|---|---|---|
| 6,976,164 B1 * | 12/2005 | King | G06Q 20/202 705/21 |
| 8,141,107 B2 | 3/2012 | Obeid et al. | |
| 9,276,952 B2 | 3/2016 | Simpson et al. | |
| 9,736,177 B2 * | 8/2017 | Simpson | H04W 24/04 |
| 10,243,679 B2 * | 3/2019 | Simpson | H04B 17/17 |
| 10,654,166 B1 * | 5/2020 | Hall | G06F 9/542 |
| 2006/0036953 A1 | 2/2006 | Rosar | |
| 2014/0075563 A1 * | 3/2014 | Simpson | H04L 63/1433 726/25 |
| 2014/0325531 A1 | 10/2014 | Harm et al. | |
| 2016/0142434 A1 * | 5/2016 | Simpson | G06F 21/577 726/1 |
| 2017/0264378 A1 * | 9/2017 | Simpson | H04B 17/102 |
| 2018/0198773 A1 | 7/2018 | Linszner | |

OTHER PUBLICATIONS

How to Scan Websites with Form Authentication, Single Sign-On & CAPTCHA with Netsparker Desktop, <https://www.netsparker.com/blog/docs-and-faqs/form-authentication-password-protected-websites-netsparker/>, accessed online Mar. 4, 2019.

(Continued)

*Primary Examiner* — Manglesh M Patel
(74) *Attorney, Agent, or Firm* — Michael Dryja (57) ABSTRACT

A login macro to automatically log into a web application running on a server computing device is generated from a provided username, a provided password, and a provided network address of the web application. The login macro can be generated regardless of whether the web application is logged into at a starting web page at the provided network address or at a sign-in web page navigable from the starting web page. After the login macro has been generated, that usage the login macro successfully results in logging into the web application running on the server computing device can be verified.

20 Claims, 8 Drawing Sheets

(56) References Cited

OTHER PUBLICATIONS

IBM; Action-Based Login in Appscan Standard; https://www-01.ibm.com/support/docview.wss?uid=swg21607424; Copyright IBM Corp. Nov. 30, 2016; 28 Pages.

IBM; Login Methods in Appscan Standard; https://www-01.ibm.com/support/docview.wss?607424; Need to Obtain Article; Modified Sep. 19, 2018; 3 pages.

Using iMacros with NetCrunch, <https://www.adremsoft.com/blog/view/blog/5420190673187/using-imacros-with-netcrunch>, accessed online Mar. 4, 2019.

* cited by examiner

WEB APPLICATION LOGIN MACRO GENERATION AND VERIFICATION

BACKGROUND

A significant if not the vast majority of computing devices are globally connected to one another via the Internet. While such interconnectedness has resulted in services and functionality almost unimaginable in the pre-Internet world, not all the effects of the Internet have been positive. A downside, for instance, to having a computing device potentially reachable from nearly any other device around the world is the computing device's susceptibility to malicious cyber attacks that likewise were unimaginable decades ago.

DETAILED DESCRIPTION

As noted in the background, a large percentage of the world's computing devices can communicate with one another over the Internet, which while generally advantageous renders the computing devices susceptible to cyber attack. For instance, a server computing device may run a web application. Web browser software running on client computing devices can access the web application over the Internet. That is, a web application is a computer program that performs functionality, and which uses the web browser software of a client computing device as its client.

Web applications running on server computing devices thus can provide diverse services, including email, remote computing device access, electronic commerce, financial account access, and so on, which are accessible via web browser software running on client computing devices. In general, for such web application-provided services, users establish accounts and then can access the accounts by providing usernames associated with the accounts and corresponding passwords. The services, in other words, are password-protected services. The term "username" is used herein generally, and encompasses an account name associated with an account, which is typically not the name of a particular user, for instance.

Running a web application can expose a server computing device to cyber attacks, particularly if the web application has security vulnerabilities that a nefarious party can leverage to cause the application to perform unintended functionality and/or to access the underlying server computing device. Web applications are therefore audited to identify such security vulnerabilities. To thoroughly and completely perform a security audit of a web application, automated such auditing includes logging into the application with a username and password associated with a previously established account.

Web applications can have vastly different login pages at which usernames and passwords are entered. While the actual security vulnerability auditing process may be similar across web applications and thus potentially straightforward to automate in a somewhat common manner, the initial login process can be at least substantially unique for each application. This means that the initial login process may not be easily automated without sometimes significant user involvement.

For example, before a web application may be audited for security vulnerabilities, a macro that automates the login process onto the web application may have to be manually created. A user's interactions with a web application may be recorded as the user navigates to a network address of the application, locates a login form at a corresponding web page of the web application, and enters and submits a username and associated password to gain access to the application. Once this login process has been recorded as a macro, an automated security vulnerability audit can play back the macro to secure access to the web application so that the audit can probe the application for security vulnerabilities.

To audit a large number of web applications, however, this means that a user has to manually log onto each web application while the user's interactions are being recorded, in order to create a corresponding login macro. Such a labor-intensive login macro creation process can become a bottleneck for auditing the web applications in a timely manner. Techniques described herein ameliorate this issue.

Specifically, a login macro for a web application running on a server computing device can be generated without user interaction, such as without having to record a user's interactions with the web application in logging into the application. A client computing device can generate a login macro to automatically log into the web application, from a provided username, a provided password, and a provided network address at which the web application is accessible on a network like the Internet. The username, password, and network address of the web application can be provided a priori, for each of a large number of web applications, permitting automated generation of the login macros for the applications more quickly, which in turns makes for more timely security auditing of the applications.

The login macro for a web application may be able to be generated regardless of whether the web application has a login form at what is referred to as a starting web page at the provided network address, or at a different sign-in web page that is navigable from the starting web page. Once the login macro has been generated, it can be automatically verified to ensure that usage of the macro indeed successfully results in logging into the web application. There can thus be a relatively high confidence that a generated login macro will be able to be successfully used during security vulnerability auditing of the web application. Manual login macro creation may just have to be performed for a relatively small number of web applications for which macros cannot be generated, or for which such macros are not successfully verified.

Figure 1:
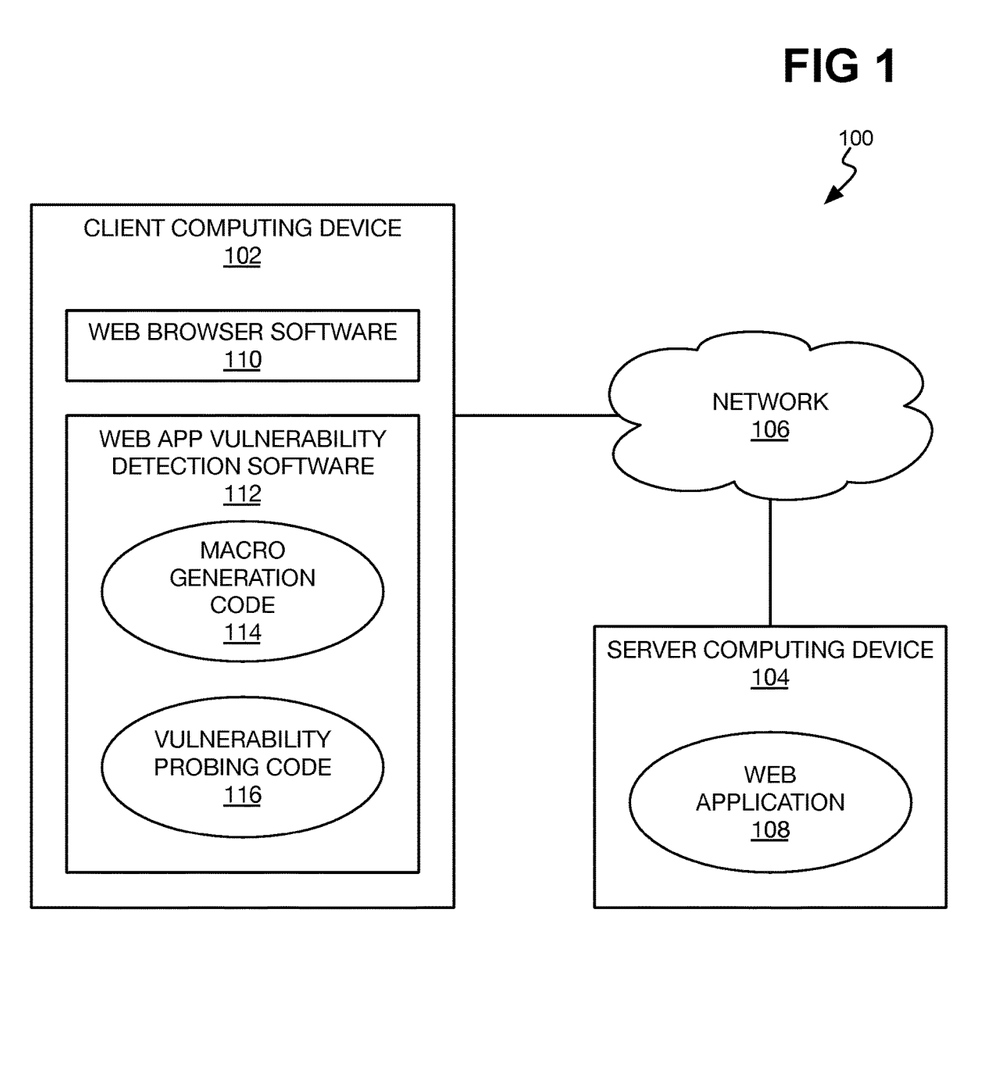
FIG. 1 is a diagram of an example computing system in which a client computing device communicates with a server computing device to run a web application at the server in the context of web browser software at the client.

FIG. 1 shows an example system 100. The system 100 includes a client computing device 102 and a server computing device 104 that can communicate with one another over a network 106. The client computing device 102 may be a desktop or laptop computer, for instance, or another type of computing device, like a smartphone, tablet computing device, and so on. The server computing device 104 may be a standalone server computing device or a server computing device, like a blade computing device, installed within a rack with other server computing devices. The client computing device 102 is also referred to herein as the client 102, and the server computing device 104 is also referred to herein as the server 104. The network 106 can be or include the Internet, intranets, extranets, and other types of networks.

A web application 108 runs on the server 104, whereas web browser software 110 and web application vulnerability detection software 112 run on the client 102. The web application 108 is a client-server software application program that the client 102 runs on the server 104 via the web browser software 110. The web browser software 110 is thus effectively a client of the web application 108, where input and output of the web application 108 occur at the web browser software 110.

The web application vulnerability detection software 112 includes login macro generation code 114 and security vulnerability probing code 116. The macro generation code 114 can automatically generate a login macro to log onto the web application 108 running on the server 104, via the web browser software 110. The macro generation code 114, from a provided username, a provided password, and a provided network address such as a Uniform Resource Locator (URL) address at which the web application 108 is addressable on the network 106, access the application 108 via a web browser session of the web browser software 110. The macro generation code 114 generates the login macro from the provided username, password, and network address without having to record a user's interactions with the web application 108 within such a browser session.

The web application vulnerability detection software 112 includes vulnerability probing code 116 that can then probe the web application 108 running on the server computing device 104 to identify potential security vulnerabilities after having logged onto the application 108. That is, once the login macro generation code 114 has generated the login macro, the vulnerability probing code 116 can spawn a web browser session with the web browser software 110 to log into the web application 108 by running the login macro. After having logged into the web application 108 by running the created macro, the vulnerability probing code 116 has thorough access to the web application 108 within the browser session in question, and can probe the application 108 for security vulnerabilities via this browser session of the web browser software 110. The approach that the vulnerability probing code 116 uses to probe the web application 108 and then assess vulnerabilities thereof can be any of a number of different approaches.

Figure 2:
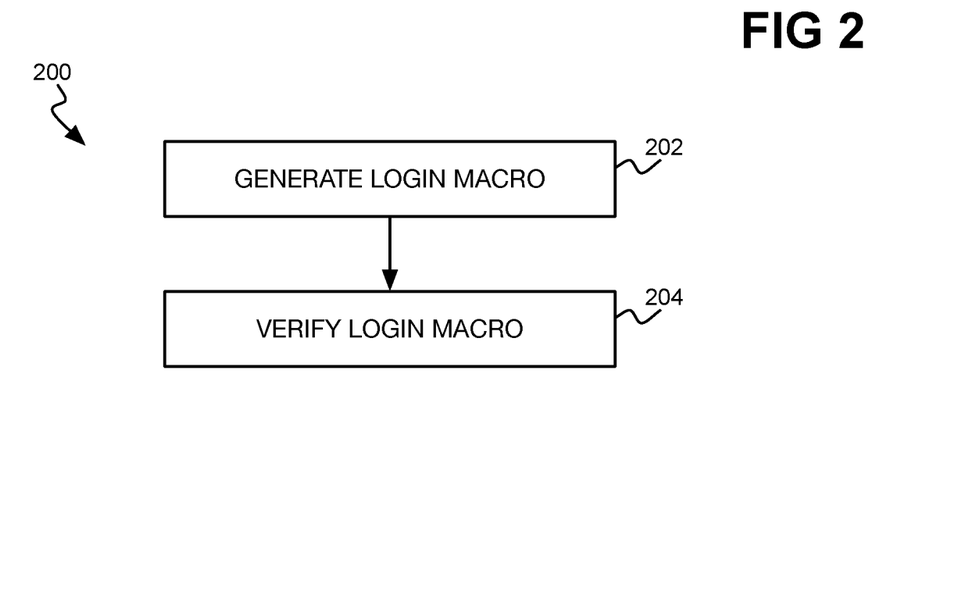
FIG. 2 is a flowchart of an example method for creating and verifying a login macro to automatically log into a web application.

FIG. 2 shows an example method 200 that can be performed within the computing system 100. The method 200 can be performed by a computing device, such as the client computing device 102. The method 200 can be implemented as program code stored on a non-transitory computer-readable data storage medium and executed by the computing device.

The client 102, via the macro generation code 114 of the web application vulnerability detection software 112 in communication with a browser session of the web browser software 110 in which the web application 108 running on the server 104 is accessed over the network 106, generates a login macro (202). The client 102 generates the login macro to automatically log into the web application 108. The client 102 generates the login macro from a provided username, a provided password, and a provided network address at which the web application 108 is accessible by the web browser software 110 on the network 106.

After generating the login macro, the client 102 verifies that usage of the login macro successfully results in logging into the web application 108 running on the server 104 (204). For instance, the macro generation code 114 may spawn another browser session in the web browser software 110 and run the macro in the context of the session to attempt to log onto the web application 108 over the network 106. That is, even if a login macro is created in part 202, the method 200 also verifies that the macro works in part 204.

Figure 3:
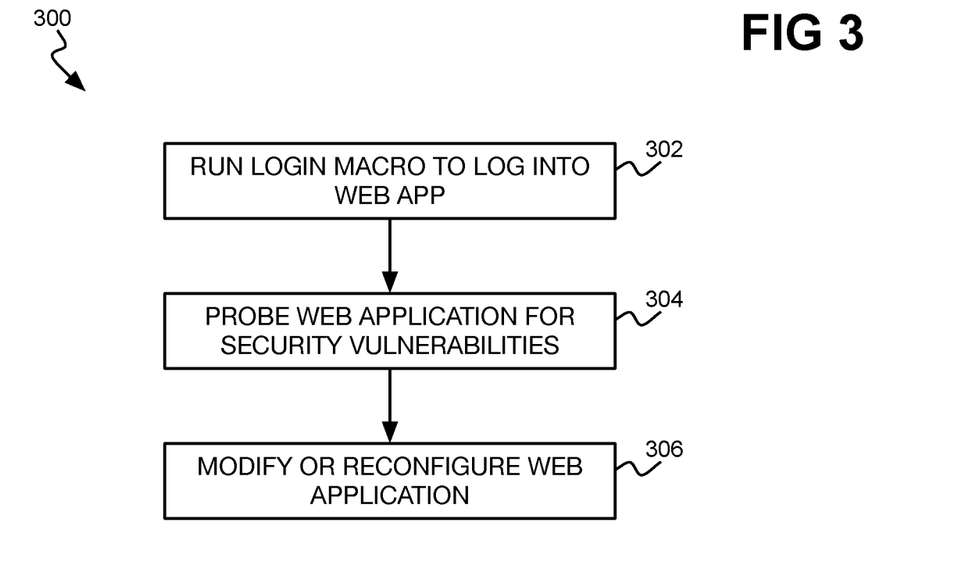
FIG. 3 is a flowchart of an example method for identifying security vulnerabilities within a web application using a created login macro and that can be performed after the method of FIG. 3 has been performed.

FIG. 3 shows another example method 300 that can be performed within the computing system 100. The method 300, like the method 200, can be performed by a computing device, such as the client computing device 102. The method 300 thus also can be implemented as program code stored on a non-transitory computer-readable data storage medium and executed by the computing device. The method 300 is performed after a login macro for the web application 108 has been generated, and therefore can be performed after the method 200 has been performed.

The client 102, via the vulnerability probing code 116 of the web application vulnerability detection software 112 in communication with a browser session of the web browser software 110 in which the web application 108 running on the server 104 is accessed over the network 106, runs the login macro (302). Running the login macro results in automatic navigation to a web page at which the web application 108 exposes a login form, and then in automatic entry and submission of a username and a password within the login form. As such, running the login macro results in logging into the web application 108.

The client 102, after having logged into the web application 108, can probe the web application 108 for security vulnerabilities (304). The vulnerability probing code 116 of the web application vulnerability detection software 112, via the browser session of the web browser software 110 in which the web application 108 has been logged into, can thus make malformed and nefarious-intended requests to the application 108 and analyze how the application 108 responds to such requests. The web application 108 may be modified or reconfigured to resolve any security vulnerabilities that are identified as a result of such probing (306).

Figure 4:
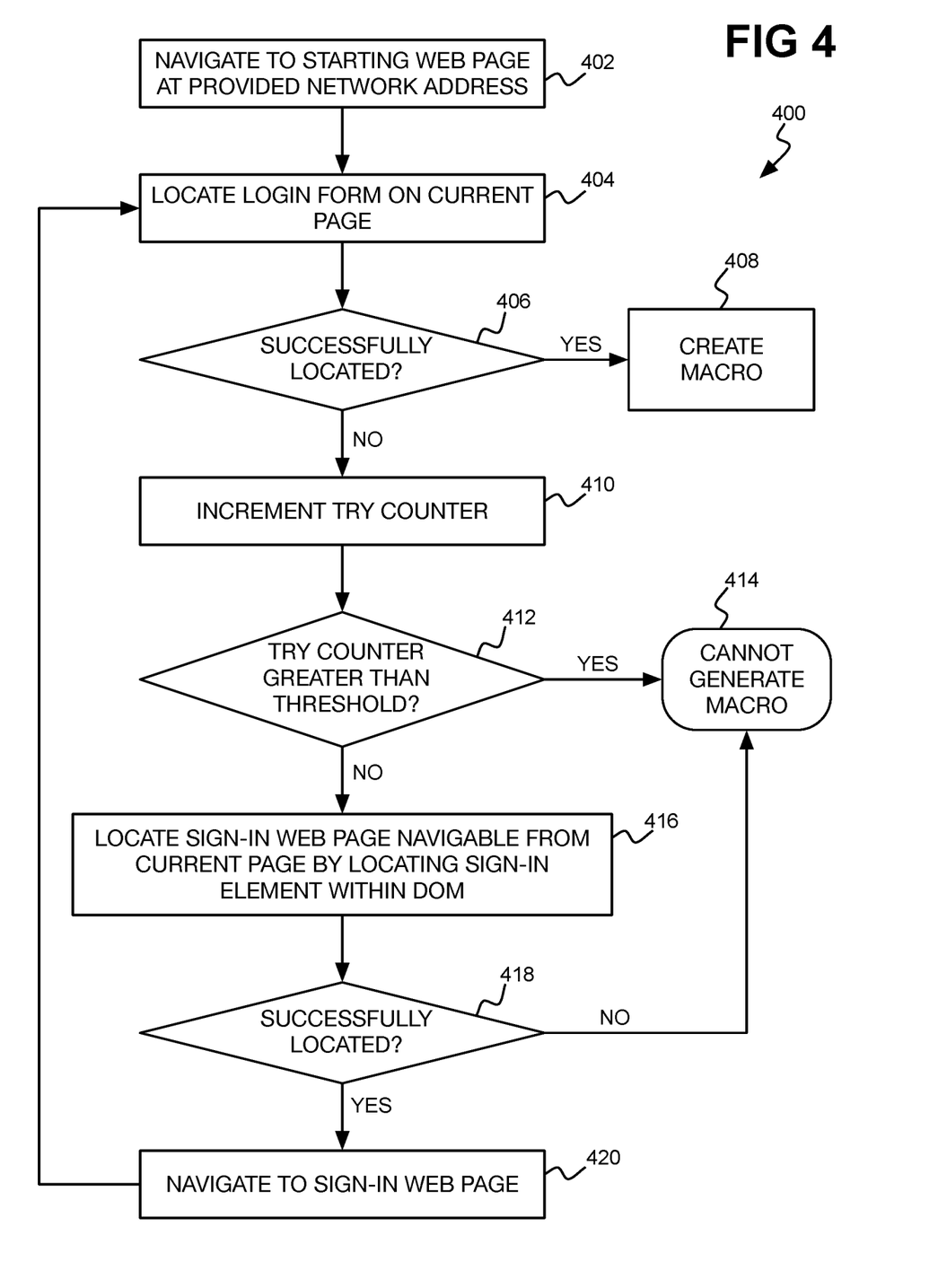
FIG. 4 is a flowchart of an example method for creating a login macro and that can be performed to implement a part of the method of FIG. 2.

FIG. 4 shows an example method 400 for generating a login macro, from a provided username, a provided password, and a provided network address of the web application 108, to automatically log into the application 108. The method 400 can be performed as part 202 of FIG. 2. Like the prior methods that have been described, the method 400 can be performed by a computing device, such as the client 102, and implemented as program code stored on a non-transitory computer-readable data storage medium and executed by the computing device.

The client 102 navigates to the web page that the web application 108 exposes at the provided network address (402). The web page that the client 102 reaches at the provide network address is referred to as the starting web page of the web application 108. The client 102 attempts to locate a login form on the current web page (404), which is the starting web page the first time that part 404 is performed.

The web page has a document object model (DOM). The DOM is an application programming interface (API) that treats a markup language document as a tree structure in which each node is an object representing a part of the document, with the document represented as a logical tree. Each branch of the tree ends in a node, and each node contains objects. To render a web page, the web browser software 110 uses the DOM. That is, the browser software 110 downloads markup language of the web page from the web application 108 into local memory and parses this markup language to display the page. When downloading the web page, the browser software 110 thus creates a DOM of the page, which is an object-oriented representation of the markup language of the web page.

The login form that the client 102 attempts to locate is a form markup element within the DOM of the web page in which a username and password can be entered and submitted to log onto the web application 108. A specific example by which the login form can be located on a web page is described later in the detailed description. If the login form has been successfully located on the current web page (406), such as the starting web page of the web application 108 the first time part 404 is performed, then the client 102 can proceed to create the login macro (408).

However, if the login form has not been successfully located on the current web page of the web application 108 (406), then the client increments a try counter (410). The try counter indicates the number of different web pages of the web application 108 that have been analyzed to locate a login form in which a username and password can be entered and submitted to log onto the web application 108. If the try counter is greater than a threshold (412), then the method 400 unsuccessfully finishes with the client 102 not generating a login macro (414).

The try counter threshold may be set to two, for instance, denoting that the client 102 will attempt to locate the login form on the starting web page of the web application 108 and at most one other web page of the application 108. The try counter threshold may be set to one if just the starting web page that the web application 108 exposes at the provided network address is analyzed to locate the login form. The counter threshold may be set to greater than two if more than one other web page of the web application 108 are to be maximally analyzed to locate the login form.

The login form at which a username and password are entered and submitted to log onto the web application 108 may not, for instance, be located within the starting web page of the application 108. Rather, there may be a hyperlink or other selectable markup language element that when selected results in the web browser software 110 navigating to another web page of the web application 108. The web page to which the web browser software 110 navigates to from the starting web page may itself not include the login form, but may provide a markup language element that when selected results in navigation to still another web page of the web application 108 that can then be analyzed to locate the login form.

Therefore, if the try counter is not greater than the threshold (412), the client 102 attempts to locate another sign-in web page of the web application 108 that is navigable from the current web page (416). The client 102 specifically attempts to locate a sign-in markup language element within the DOM of the current web page that when selected will navigate to a sign-in web page of the web application 108 at which the login form may be located. This web page is referred to as a sign-in web page to distinguish it from the starting web page of the web application 108. The starting web page may thus have a sign-in element leading to a sign-in web page, where the sign-in web page may lead to another sign-in web page, and so on, depending on the threshold governing the number of web pages of the web application 108 that will be maximally inspected to locate the login form. A specific example by which the sign-in element can be located on a web page is described later in the detailed description.

If the client 102 successfully locates a sign-in web page navigable from the current web page (418), then the client 102 navigates to the sign-in web page (420). For example, the macro generation code 114 may select the located sign-in markup language element within the web browser session of the web browser software 110 in which the web application 108 running on the server 104 is being accessed over the network 106. The sign-in web page to which the client 102 navigates becomes the current web page, and the method 400 is repeated at part 404. However, if the client 102 cannot successfully locate a sign-in web page navigable from the current web page (418), then the method 400 unsuccessfully finishes with the client 102 not generating a login macro (414).

Figure 5:
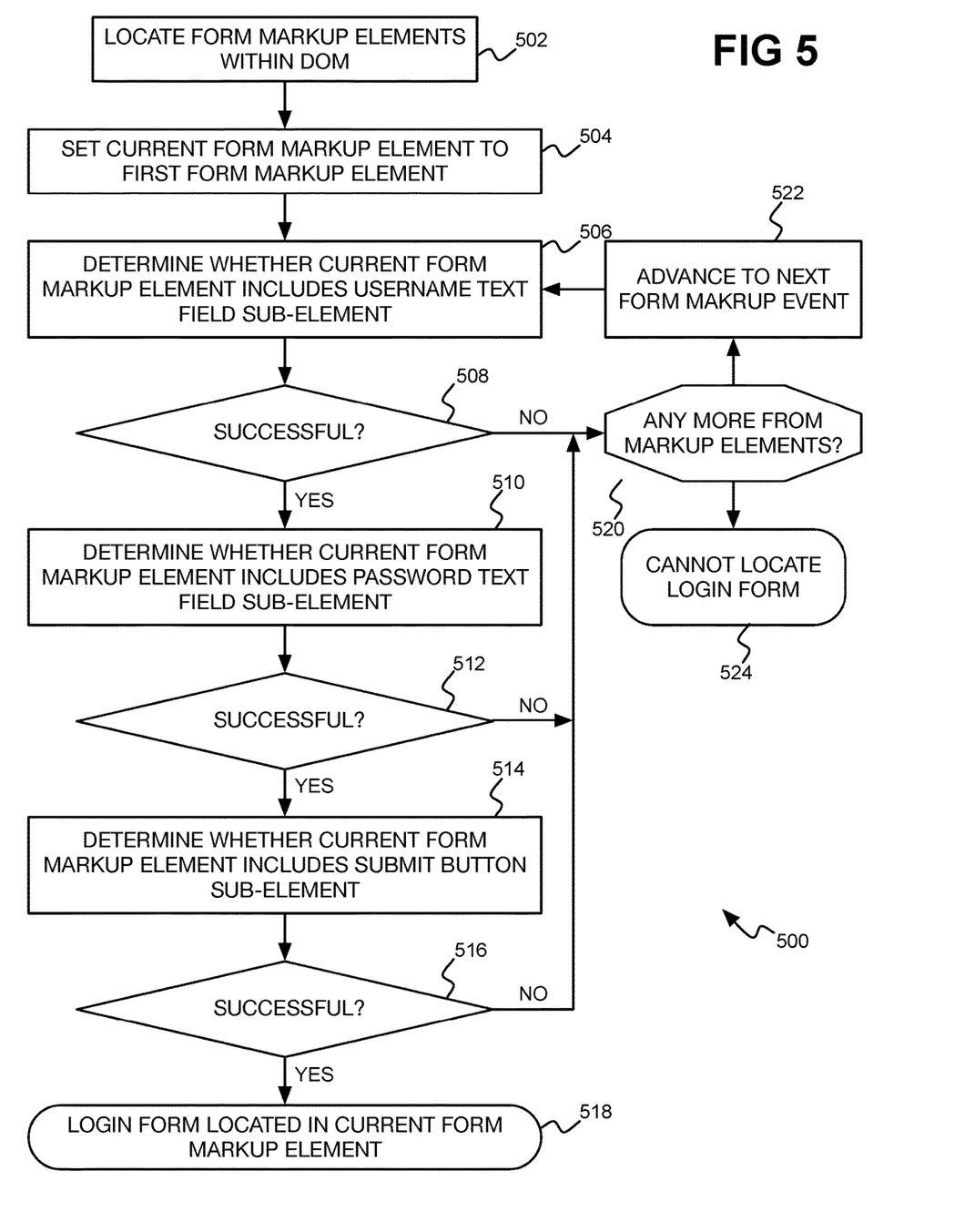
FIG. 5 is a flowchart of an example method for locating a login form within a web page of a web application and that can be performed to implement a part of the method of FIG. 4.

FIG. 5 shows an example method 500 for locating a login form within a web page of the web application 108. The method 500 can be performed as part 404 of FIG. 4, such that the method 500 locates a login form within the current web page of the web application 108, which may be the starting web page or a sign-in web page. Like the prior methods that have been described, the method 500 can be performed by a computing device, such as the client 102, and implemented as program code stored on a non-transitory computer-readable data storage medium and executed by the computing device.

The client 102 identifies or locates every form markup language element within the DOM of the web page in relation to which the method 500 is being performed (502). For example, each such form element may be identified within the markup language of the web page represented by the "<form>" element. A current form markup language element is then set to the first form markup language element that has been located within the web page (504).

The client 102 determines whether the current form markup element includes a username text field sub-element (506), which is a text field sub-element of the current form markup element having an associated label corresponding to a username regular expression and thus presumed to be the text field sub-element of a login form at which the provided username can be entered. Specifically, the client 102 locates all input text objects that are markup language sub-elements of the current form markup element. Each such input text object may be represented as an "<input>" element with type "text."

If the input text object of a text field sub-element includes placeholder text, then the placeholder text may be considered the label of the text field sub-element. The client 102 determines whether this label corresponds to a username regular expression. For example, the label may be compared to a list of username text, such as "user name," "username," "user id," "userid," "email," and "login." If the label matches any entry within this list, then the text field sub-element is considered as the username text field sub-element.

If there is no placeholder text of the input text object or if it does not match any entry within the list, then the client 102 may look for a sibling sub-element to the text field sub-element that is a text node, in which case the text of the sibling sub-element is considered the label of the text field sub-element. The client 102 determines whether this label corresponds to the username regular expression as described in the previous paragraph. If the text of this sibling sub-element matches any entry within the list of username text, then the text field sub-element is considered as the username text field sub-element.

If there is no such sibling sub-element to the text field sub-element or if its text does not match any entry within the list, then the client 102 may look for a sibling element of the parent element of the text field sub-element within the DOM that is a text node. The client 102 determines whether this label corresponds to the username regular expression as described in the previous paragraph. If the text of this parent element's sibling element matches any entry within the list of username text, then the sibling element is considered as the username text field sub-element.

If there is no such sibling element to the parent element of the text field sub-element, or if its text does not match any entry list within the list, the client 102 may continue to traverse other sibling nodes to the parent element, and then sibling nodes to the grandparent element of the text field sub-element (i.e., the parent element of the text field sub-element's parent element), and so on. This process continues until an element is located that is a text field element and has text matching any entry within the list of username text, or until there are no further such elements. Therefore, part 506 concludes either with the current form markup language element being considered as including a username text field sub-element at which the provided username is to be entered, or with the current form markup language element being considered as not including a username text field sub-element at which the provided username is to be entered.

If the current form markup element is considered as including a username text field sub-element at which the provided username is to be entered (508), then the client 102 next determines whether the current form markup element includes a password text field sub-element (510). The password text field sub-element is a text field sub-element of the current form markup element subsequent to the username text field sub-element that has been located within the DOM and that has an associated label corresponding to a password regular expression. As such, the password text field sub-element is presumed to be the text field sub-element of a login form at which the provided password can be entered.

In one implementation, the client 102 can perform 510 to determine whether there is a password text file sub-element by looking for "<input type="password">". In another implementation, the client 102 can perform part 510 to determine whether there is a password text field sub-element in a similar manner as has been described in relation to part 506 to determine whether there is a username text field sub-element. The differences may be two-fold. First, part 510 considers just the text field sub-elements of the current form markup language that appear in the DOM of the current web page after the username text field sub-element that has been successfully located. Second, part 510 uses a different list of text against which to perform the regular expression matching. That is, rather than comparing a label to a list of username text, the client 102 compares the label to a list of password text, such as "password," "pw," and so on.

If the current form markup element is considered as including a password text field sub-element at which the provided password is to be entered (512), then the client 102 next determines whether the current form markup element includes a submit button sub-element (514). The submit button sub-element is a button sub-element of the current form markup element subsequent to the password text field sub-element that has been located in the DOM and that has an associated label corresponding to a login regular expression. As such, the submit button sub-element is presumed to be the button sub-element of a login form that is selected once the provided username and password have been entered in their corresponding text field sub-elements.

Specifically, the client 102 locates all button objects that are markup language sub-elements of the current form markup element and that appear in the DOM after the password text field sub-element that has been successfully located. Each such button object may be represented as a "<button>" element with type "submit", for instance, or as "<input type="submit">". The client 102 determines whether the label of any of these button objects corresponds to a login regular expression. For example, the label may be compared to a list of login text, such as "log in," "login," "sign in," "signin," and so on. If the label matches any entry within this list, then the button object in question is considered as the submit button sub-element.

If such a submit button sub-element has been successfully located within the current form markup element (516), then the current form markup element is considered as the login form in which the provided username and password are entered to log into the web application 108 (518). That is, the provided username is entered in the username text field that has been determined and the provided password is entered in the password text field that has been determined, in that order, and once the username and password have been entered, the submit button sub-element that has been determined is then selected, to log into the web application 108. The login macro can then be generated in part 408 of FIG. 4 using this information.

For example, the login macro may include script operations that navigate to the web page of the web application 108 at which the login form element has been located, and that then locate the determined login form element within the DOM of this web page. The login macro may include script operations that, after identifying the login form element within the web page's DOM, identify the determined username text field and the determined password text field and respectively input the provided username and password in these text fields. The login macro may include script operations that then select the determined submit button sub-element to pass the entered username and password to the web application 108, to log onto the application 108.

If the client 102 does not successfully determine that the current form markup element includes a username text field sub-element (508), that the current form markup element includes a password text field sub-element (512), or that the current form markup element includes a submit button sub-element (516), then the client 102 proceeds to analysis of the next form markup element that has been located within the DOM of the web page being analyzed, if any. That is, if there are any other form markup elements within the web page's DOM that have not yet been analyzed (520), the client 102 advances to the next form markup element of the DOM (522), which is considered the new current form markup element. The method 500 is thus repeated at part 506.

However, if there are no further form markup elements within the DOM of the web page that have yet to be analyzed (520), then the client 102 finishes the method 500 unsuccessfully. That is, a login form at which a provided username and password can be entered to log onto the web application 108 is not successfully located within the web page in relation to which the method 500 has been performed. The method 500 therefore can conclude by successfully locating such a login form in part 518, or by not being able to successfully locate such a login form in part 524.

Figure 6:
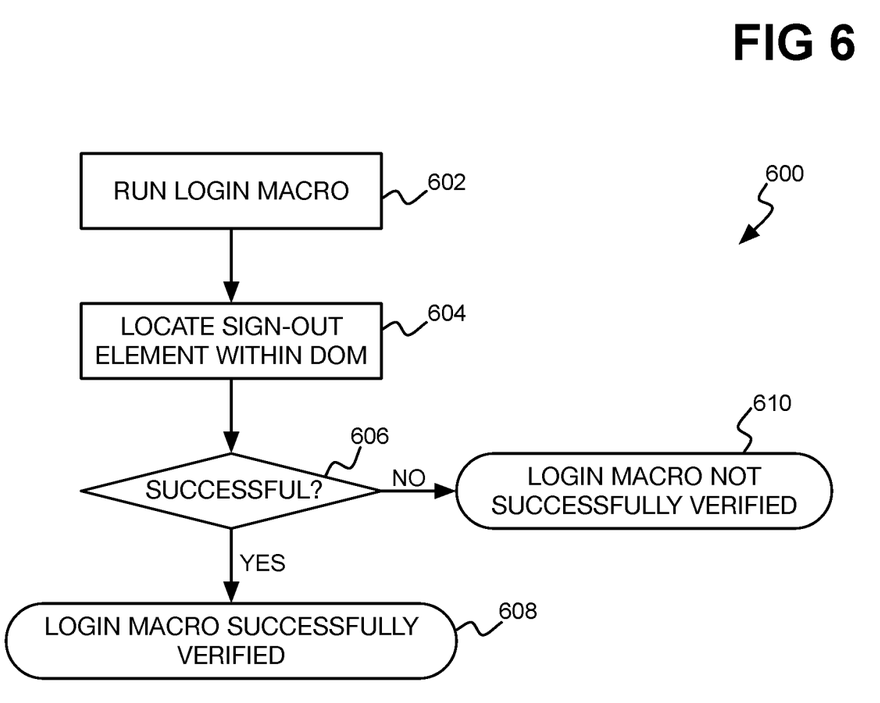
FIG. 6 is a flowchart of an example method for verifying a created login macro to automatically log into a web application and that can be performed to implement a part of the method of FIG. 2.

FIG. 6 shows an example method 600 for verifying a created login macro. The method 600 can be performed as part 204 of FIG. 2. Like the prior methods that have been described, the method 600 can be performed by a computing device, such as the client 102, and implemented as program code stored on a non-transitory computer-readable data storage medium and executed by the computing device.

The client 102 runs a login macro that has been created (602). For example, the login macro may have been created as has been described above in relation to FIGS. 4 and 5. The client 102 thus navigates to the web page of the web application 108 specified by the macro. This is the web page that that includes the login form at which the provided username and password are to be entered to log into the web application 108. The macro may have been created to navigate to the network address of this web page, which may be the starting web page or a subsequent sign-in web page. The macro may have instead been created to navigate to the network address of the starting web page, followed by locating and selecting a sign-in element on the starting web page (and the sign-in element of each intervening web page, if any) to navigate to the sign-in web page including the login form.

After having navigated to the appropriate web page, the client 102 next locates the form markup element within the DOM of the web page that corresponds to the login form at which the provided username and password are to be entered, as specified by the macro. The client 102, as directed by the macro, locates the determined username and password text field sub-elements within the located form markup element, and enters the username and password provided by the macro in these text fields. The client 102 finally locates and selects the determined submit button sub-element within the located form markup element, as directed by the macro.

The client 102 then attempts to locate a sign-out element within the DOM of the web page presented by the web application 108 after the login macro has been run (606). A specific example by which the sign-out element can be located on a web page is described later in the detailed description. If the web page of the web application 108 at which running of the macro ends includes such a sign-out element, the method 600 considers the login macro as having been successfully verified. That is, usage of the login macro successfully results in logging into the web application 108 running on the server computing device 104.

Therefore, if the client 102 successfully locates a sign-out element within the DOM of the web page at which running of the macro ends (606), the created login macro has been successfully verified (608). If the client 102 cannot successfully locate such a sign-out element (606), however, then the created login macro has not been successfully verified (610). The login macro may be considered as being unsuccessfully verified if running the macro does not actually result in logging into the web application 108, if running the macro results in logging into the application 108 but the ending web page does not include a sign-out element, or if running the macro results in logging into the web application 108 with an ending web page that does include a sign-out element but that the client 102 cannot locate.

Figure 7:
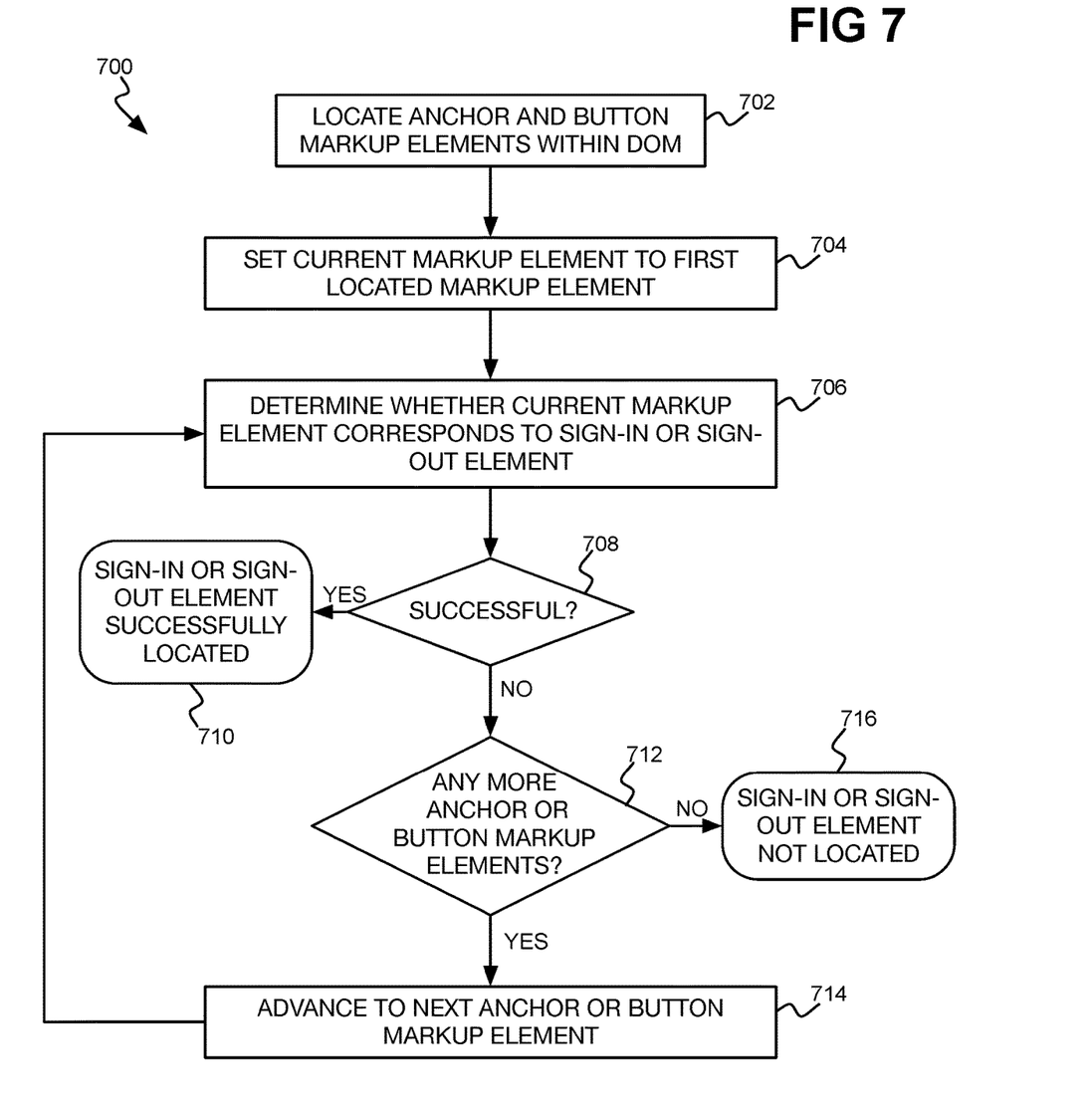
FIG. 7 is a flowchart of an example method for locating a sign-in or sign-out element within a web page of a web application and that can be performed to implement parts of the methods of FIGS. 4 and 6.

FIG. 7 shows an example method for locating a sign-in or sign-out element within a web page of the web application 108. The method 700 can be performed to implement part 416 of FIG. 4 as well as part 604 of FIG. 6. In the case of part 416, the method 700 is used to locate a sign-in element within the web page's DOM, and, in the case of part 604, the method 700 is used to locate a sign-out element within the DOM. Like the prior methods that have been described, the method 700 can be performed by a computing device, such as the client 102, and implemented as program code stored on a non-transitory computer-readable data storage medium and executed by the computing device.

The client 102 identifies or locates the anchor and button markup elements within the DOM of the web page in relation to which the method 700 is being performed (702). For example, each such button markup element may be identified within the markup language of the web page via the "<button>" element, and each such anchor markup element may be identified within the web page's markup language via the "<a>" element. A current anchor or button markup element is then set to the first such anchor or button markup language element that has been located (704).

The client 102 determines whether the current markup element corresponds to a sign-in element (in the case in which part 416 of FIG. 4 is being implemented) or a sign-out element (in the case in which part 604 of FIG. 6 is being implemented) (706). Specifically, for the current markup element under analysis, the client 102 determines whether there is an associated label corresponding to a sign-in our sign-out regular expression. For example, the client 102 can determine whether the inner text of the element, the "id" attribute of the element (if present), or the "href" attribute of the element (if present) matches a list of sign-in or sign-out text.

If a sign-in element has been searched for, then the list may be the list of login text described in relation to part 514 of FIG. 5. If a sign-out element is being searched for, then the list may be a list of sign-out text including "log out," "logout," "sign out," "signout," and so on. If the label matches any entry within the list in question, then the current markup element is considered to be a sign-in or sign-out element as appropriate. Therefore, if the client 102 determines that the current markup language element corresponds to a sign-in element (in the case in which part 416 of FIG. 4 is being implemented) or a sign-out element (in the case in which part 604 of FIG. 6 is being implemented) (708), then the method 700 ends with the sign-in or sign-out element in question having been successfully located (710).

However, if the client 102 determines that the current markup element does not correspond to a sign-in or sign-out element as appropriate (708), and if there are any other anchor or button markup elements located in part 702 that have not yet been examined (712), then the client 102 advances to the next anchor or button markup language element that was located (714). The method 700 is thus repeated at part 706 with the next anchor or button markup language being the new current markup language element. However, once the client 102 has analyzed the last anchor or button markup element located in part 702 and determines that this last markup element does not correspond to a sign-in or sign-out element, the method 700 ends with the sign-in or sign-out element in question not having been successfully located (716).

Figure 8:
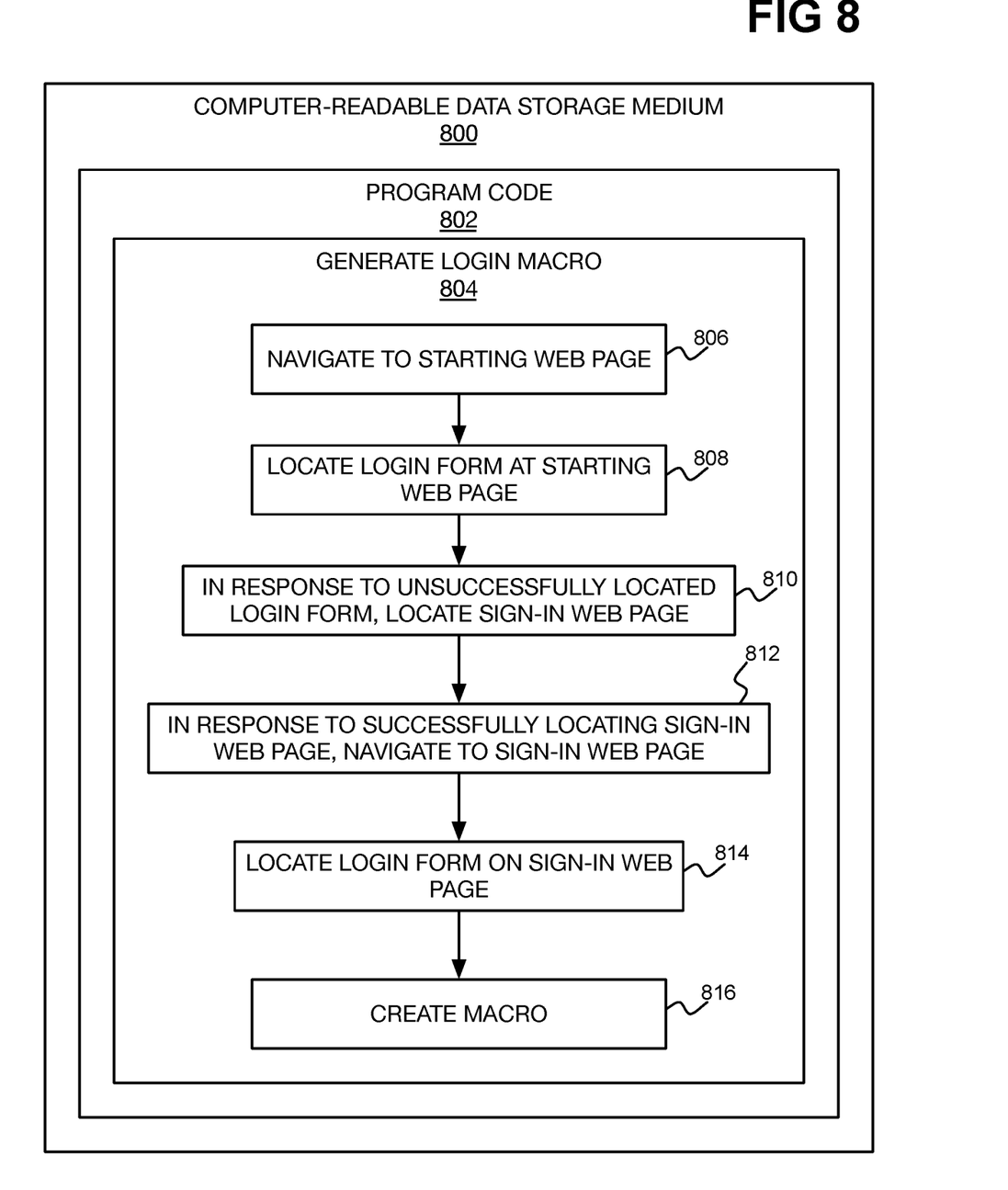
FIG. 8 is a diagram of an example computer-readable data storage medium.

FIG. 8 shows an example computer-readable data storage medium 800. The computer-readable storage medium 800 stores program code 802 executable by a client computing device to perform processing. The processing includes generating login macro to automatically log into a web application running on a server computing device (804). The macro is generated from a provided username, a provided password, and a provided network address of the web application.

The processing to generate the login macro can include navigating to a starting web page at the provided network address of the web application (806), and locating a login form at the starting web page (808). The processing can include, in response to unsuccessfully locating the login form at the starting web page, locating a sign-in web page navigable from the starting web page (810), and then in response to successfully locating the sign-in web page, navigating to the sign-in web page (812). The processing can include locating the login form at the sign-in web page (814).

The processing can include, in response to successfully locating the login form at the sign-in web page, creating the login macro (816). The login macro automatically navigates to the sign-in web page, and then automatically enters the provided username within the username text field sub-element of the login form and automatically enters the provided password within the password text field sub-element of the login. The login macro finally automatically selects the submit button sub-element.

Figure 9:
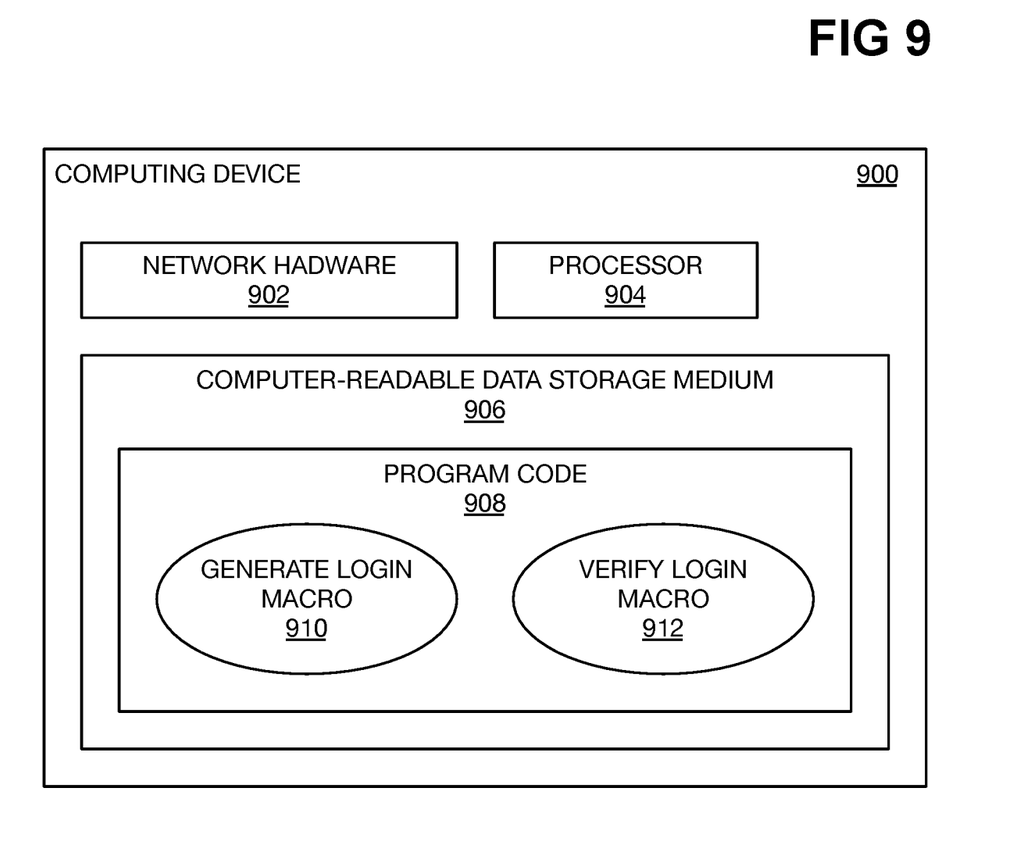
FIG. 9 is a diagram of an example computing device.

FIG. 9 shows an example computing device 900. The computing device 900 can include other hardware components, in addition to those depicted in FIG. 9. The computing device 900 includes network hardware 902 to communicatively connect the computing device 900 to a server computing device running a web application. The computing device 900 includes a processor 904, and a non-transitory computer-readable data storage medium 906. The computer-readable data storage medium 906 stores program code 908 executable by the processor 904 to perform processing.

The processing includes generating a login macro to automatically log into the web application (910). The login macro is generated from a provided username, a provided password, and a provided network address of the web application, regardless of whether the web application is logged into at a starting web page at the provided network address or at a sign-in web page navigable from the starting web page. The processing includes, after generating the login macro, verifying that usage of the login macro successfully results in logging into the web application running on the server computing device (912).

Techniques have been described herein to generate login macros to log into web applications running on computing devices, without having to record users manually logging into the applications. As such, macro creation does not become a bottleneck for auditing large numbers of web applications in a timely manner. So long as a username and password pair and a network address is initially provided for each web application, a corresponding login macro can likely be generated without any user involvement.

We claim:

1. A method comprising:
generating, by a client computing device, a login macro to automatically log into a web application running on a server computing device, from a provided username, a provided password, and a provided network address of the web application, without user interaction;
after generating the login macro, verifying, by the client computing device, that usage of the login macro successfully results in logging into the web application running on the server computing device;
in response to successfully verifying that the usage of the login macro successfully results in logging into the web application, running the login macro to log into the web application;
after logging into the web application, probing, by the client computing device, the web application to identify security vulnerabilities within the web application; and
in response to identifying any security vulnerabilities within the web application, modifying or reconfiguring the web application to ameliorate the identified security vulnerabilities.

2. The method of claim 1, wherein generating the login macro comprises:
navigating to a starting web page at the provided network address of the web application, without user interaction; and
locating a login form at the starting web page.

3. The method of claim 2, wherein locating the login form at the starting web page comprises:
locating one or more form markup language elements within a document object model for the starting web page;
determining whether any located form markup language element includes a username text field sub-element, a password text field sub-element, and a submit button sub-element; and
concluding that the login form has been successfully located responsive to determining that any located form markup language element includes the username text field sub-element, the password text field sub-element, and the submit button sub-element.

4. The method of claim 3, wherein determining whether any located form markup language element includes the username text field sub-element, the password text field sub-element, and the submit button sub-element comprises:
determining whether a given form markup language element located within the document object model includes a first text field sub-element having an associated label corresponding to a username regular expression; and
concluding that the given form markup language element includes the username text field sub-element responsive to determining that the given form markup language element includes the first text field sub-element.

5. The method of claim 4, wherein determining whether any located form markup language element includes the username text field sub-element, the password text field sub-element, and the submit button sub-element further comprises:
after concluding that the given form markup language element includes the username text field sub-element, determining whether the given form markup language element includes a second text field sub-element having an associated label corresponding to a password regular expression and located after the first text sub-element in the given form markup language element; and
concluding that the given form markup language element includes the password text field sub-element responsive to determining that the given form markup language element includes the second text field sub-element.

6. The method of claim 5, wherein determining whether any located form markup language element includes the username text field sub-element, the password text field sub-element, and the submit button sub-element further comprises:

after concluding that the given form markup language element includes the password text field sub-element, determining whether the given form markup language element includes a button sub-element having an associated label corresponding to a login regular expression and located after the second text sub-element in the given form markup language element; and concluding that the given form markup language element includes the submit button sub-element responsive to determining that the given form markup language element includes the button sub-element.

7. The method of claim 3, wherein generating the login macro further comprises, in response to successfully locating the login form at the starting web page:

creating a macro that automatically navigates to the starting web page, then automatically enters the provided username within the username text field sub-element of the login form and automatically enters the provided password within the password text field sub-element of the login, and finally automatically selects the submit button sub-element.

8. The method of claim 2, wherein generating the login macro further comprises:

in response to unsuccessfully locating the login form at the starting web page, locating a sign-in web page navigable from the starting web page;

in response to successfully locating the sign-in web page, navigating to the sign-in web page; and locating the login form at the sign-in web page.

9. The method of claim 8, wherein locating the sign-in web page navigable from the starting web page comprises:

locating one or more anchor or button markup language elements within a document object model for the starting web page;

determining whether any located anchor or button markup language element corresponds to a sign-in element; and concluding that the sign-in web page navigable from the starting web page has been successfully located responsive to determining that any located anchor or button markup language element corresponds to the sign-in element.

10. The method of claim 9, wherein navigating to the sign-in web page comprises:

selecting a located anchor or button markup language element within the document object model that corresponds to the sign-in element.

11. The method of claim 9, wherein determining whether any located anchor or button markup language element corresponds to the sign-in element comprises:

determining whether a given anchor or button markup language element located within the document object model has an associated label corresponding to a login regular expression; and concluding that the given anchor or button markup language element corresponds to the sign-in element responsive to determining that the given anchor or button markup language element has the associated label.

12. The method of claim 8, wherein locating the login form at the sign-in web page comprises:

locating one or more form markup language elements within a document object model for the sign-in web page;

determining whether any located form markup language element includes a username text field sub-element, a password text field sub-element, and a submit button sub-element; and concluding that the login form has been successfully located responsive to determining that any located form markup language element includes the username text field sub-element, the password text field sub-element, and the submit button sub-element.

13. The method of claim 12, wherein generating the login macro further comprises, in response to successfully locating the login form at the sign-in web page:

creating a macro that automatically navigates to the sign-in web page, then automatically enters the provided username within the username text field sub-element of the login form and automatically enters the provided password within the password text field sub-element of the login, and finally automatically selects the submit button sub-element.

14. The method of claim 1, wherein verifying that the usage of the login macro successfully results in logging into the web application comprises:

running the login macro;

locating a sign-out element within a document object model for a web page at which running of the login macro ends; and in response to successfully locating the sign-out element, concluding that the usage of the login macro successfully results in logging into the web application.

15. The method of claim 14, wherein locating the sign-out element within the document object model comprises:

locating one or more anchor or button markup language elements within the document object model;

determining whether any located anchor or button markup language element corresponds to the sign-out element; and concluding that the sign-out element has been successfully located responsive to determining that any located anchor or button markup language element corresponds to the sign-out element.

16. The method of claim 15, wherein determining whether any located anchor or button markup language element corresponds to the sign-out element comprises:

determining whether a given anchor or button markup language element located within the document object model has an associated label corresponding to a logout regular expression; and concluding that the given anchor or button markup language element corresponds to the sign-out element responsive to determining that the given anchor or button markup language element has the associated label.

17. A non-transitory computer-readable data storage medium storing program code executable by a processor to perform processing comprising:

generating a login macro to automatically log into a web application running on a server computing device, from a provided username, a provided password, and a provided network address of the web application, without user interaction;

after generating the login macro, verifying that usage of the login macro successfully results in logging into the web application running on the server computing device;

in response to successfully verifying that the usage of the login macro successfully results in logging into the web application, running the login macro to log into the web application;

after logging into the web application, probing the web application to identify security vulnerabilities within the web application; and in response to identifying any security vulnerabilities within the web application, modifying or reconfiguring the web application to ameliorate the identified security vulnerabilities.

18. The non-transitory computer-readable data storage medium of claim 17, wherein generating the login macro comprises:

navigating to a starting web page at the provided network address of the web application, without user interaction;

locating a login form at the starting web page;

in response to unsuccessfully locating the login form at the starting web page, locating a sign-in web page navigable from the starting web page;

in response to successfully locating the sign-in web page, navigating to the sign-in web page; and locating the login form at the sign-in web page; and in response to successfully locating the login form at the sign-in web page, creating the login macro that automatically navigates to the sign-in web page, then automatically enters the provided username within the username text field sub-element of the login form and automatically enters the provided password within a password text field sub-element of the login, and finally automatically selects a submit button sub-element.

19. The non-transitory computer-readable data storage medium of claim 18, wherein locating the sign-in web page navigable from the starting web page comprises:

locating one or more anchor or button markup language elements within a document object model for the starting web page;

determining whether any located anchor or button markup language element corresponds to a sign-in element by determining whether a given anchor or button markup language element located within the document object model has an associated label corresponding to a login regular expression; and; and concluding that the sign-in web page navigable from the starting web page has been successfully located responsive to determining that any located anchor or button markup language element corresponds to the sign-in element, wherein navigating to the sign-in web page comprises:

selecting a located anchor or button markup language element within the document object model that corresponds to the sign-in element.

20. A computing device comprising:

network hardware to communicatively connect the computing device to a server computing device running a web application;

a non-transitory computer-readable data storage medium storing program code; and a processor to execute the program code to:

generate a login macro to automatically log into the web application, from a provided username, a provided password, and a provided network address of the web application, without user interaction, regardless of whether the web application is logged into at a starting web page at the provided network address or at a sign-in web page navigable from the starting web page;

after generating the login macro, verify that usage of the login macro successfully results in logging into the web application running on the server computing device;

in response to successfully verifying that the usage of the login macro successfully results in logging into the web application, run the login macro to log into the web application;

after logging into the web application, probe the web application to identify security vulnerabilities within the web application; and in response to identifying any security vulnerabilities within the web application, modifying or reconfiguring the web application to ameliorate the identified security vulnerabilities.

* * * * *